J. H. DRÄGER.
METHOD OF CAUSING ARTIFICIAL RESPIRATION.
APPLICATION FILED SEPT. 7, 1910.
1,044,031.
Patented Nov. 12, 1912.
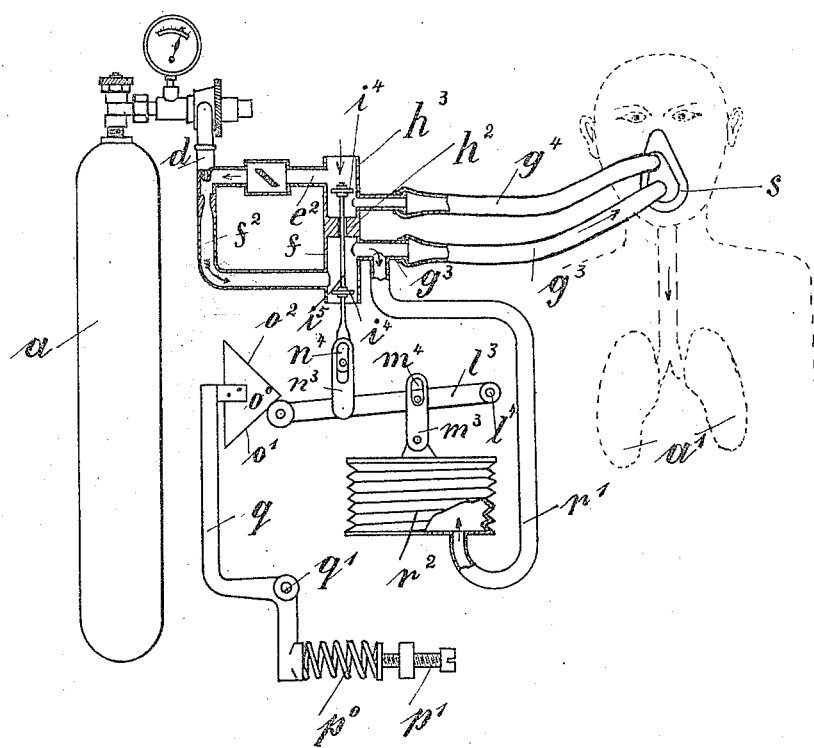
Witnesses
B. Sommers
M. J. L. Higgins.
Inventor
Johann Heinrich Dräger
By Henry Orth Jr.
Atty.

UNITED STATES PATENT OFFICE.

JOHANN HEINRICH DRÄGER, OF LÜBECK, GERMANY.

METHOD OF CAUSING ARTIFICIAL RESPIRATION.

1,044,031. Specification of Letters Patent. Patented Nov. 12, 1912.

Original application filed October 1, 1908, Serial No. 455,718. Divided and this application filed September 7, 1910. Serial No. 580,947.

*To all whom it may concern:*

Be it known that I, JOHANN HEINRICH DRÄGER, a subject of the German Emperor, and resident of Lübeck, in the German Empire, have invented a new and useful Method of Causing Artificial Respiration, of which the following is a specification.

The present invention is a division of my application #455,718, filed Oct. 1, 1908 and relates to a new method of causing people artificially to breathe. It has been suggested heretofore to force air or other suitable gas into the breathing organs of the body and then to draw out again by suction to imitate natural breathing. According to the present invention human beings are caused to breathe by connecting the breathing organs with a source of compressed gas by means of a conduit and periodically connecting this conduit with the outside air in such manner, as to make use of the compressed gas to create a sucking action and thereby to suck the air or gas from the said organs into the open air. Thus the same gas driving means is used both for producing the inhaling as well as the exhaling. Reversible valves or the like can be employed to divert the current in the way specified and any suitable driving means can be made use of to constantly reciprocate the said valves or the like at regular intervals. Thus the change from forcing to sucking and vice versa is obtained automatically, so that the space of time, within which the inhaling and the exhaling is to be carried on, can be accurately prescribed and strictly observed.

If desired the pressure which naturally increases in the conduit, when the lungs are filled and a back pressure sets in, can be made use of to automatically divert the current of gas, so as to allow the sucking action to take place. In a similar manner the sucking action when the lungs are exhausted and thus a vacuum is produced, can be made use of to automatically divert the current again so as to allow compressed air to again enter the lungs.

Means to carry out the methods described above are shown in the accompanying drawing, which is an elevation of an apparatus for automatically changing the position of the air or gas conducting means.

Means are provided to utilize the pressure of the gas to automatically change the position of the valve or cock for changing the course of the air or gas when the breathing organs of the human being are nearly filled or nearly exhausted. This method of automatically changing or reversing the course of the air or gas, may be carried out, for instance, by the apparatus shown, and will be understood from the following description.

The air or gas conducting means used in this apparatus consists of the pipes $e^2$ and $f^2$ branching off from a pipe $h^3$ in which an abutment $h^2$ is fixed. Two flexible pipes $g^3$ and $g^4$ are made use of to connect the pipe $h^2$ with the mask $s$. The pipe $e^2$ is provided with a throttling valve. A pipe $r^1$ branches off from the pipe $g^3$ near its point of connection with the pipe $h^3$. This pipe $r^1$ leads to a bellows $r^2$, the object of which is to move the pistons $i^4$, when it is necessary to change the course of the air. The bellows $r^2$ may be connected directly with the piston rod $i^5$ or by links $m^3$ and $n^3$ and a lever $l^3$ hereinafter more fully described to operate the pistons $i^4$.

In the position shown, air or a mixture of oxygen and air is driven to the lungs designated by $a^1$. At the same time a portion of the air is led to the bellows $r^2$ by way of the pipe $r^1$, without affecting the bellows on account of being too weak. When, however, the lungs are filled, the stream of air finds sufficient resistance to increase the pressure in the bellows $r^2$, which is now filled and acts on the pistons $i^4$ to change their position. The result is that a sucking action takes place to draw air from the lungs and also from the bellows. As long as the lungs are able to give air, the sucking action does not increase to such an extent as to materially decrease the pressure in the bellows. When, however, the lungs are exhausted the sucking action becomes stronger and the bellows contracts, so as to draw the piston into the first position. The operation is then repeated. It is not necessary to connect the bellows with the pipe $g^2$ near the pipe $h^3$ as shown, but it may be connected with the pipe $h^3$ itself, close to the pipe $g^3$, or at some other place of the pipe $g^3$, or with the mask, or even with the pipe $g^4$.

If it is desired to impart a more sudden or quick movement to the pistons than is possible by the means above described, the links $m^3$ and $n^3$ are provided with slots $m^4$ and $n^4$ respectively, into which pins on the piston rod $i^5$ and lever $l^3$ project; which latter is pivoted to some fixed point by a pin $l^4$. A second lever $q$ is pivoted to a fixed point by a pin $q^1$, one end of this lever $q$ being acted upon by a spring $p^0$ the tension of which may be regulated by a screw $p^1$. The other end of the lever $q$ carries a wedge-shaped cam $o^0$ having two surfaces $o^1$ and $o^2$ arranged at an angle to one another, either of which bears against the free end of the lever $l^3$ by the pressure exerted by the spring $p^0$. The bellows is then expanded or contracted so long as the exhaling or the inhaling takes place. When the pressure or the vacuum in the bellows surpasses a certain degree, so as to move the lever $l^3$ beyond its middle position, the free end of said lever slides from the surface $o^1$ to the surface $o^2$, or vice versa, and by the tension of the spring $p^0$ the second surface standing at an angle to the horizontal plane quickly moves the bellows to suddenly operate the valve.

I claim:

1. The method of producing artificial respiration which comprises filling the lungs from a suitable source of compressed gas until a back pressure of said gas sets in, when the lungs have been filled and diverting the current of gas by said pressure to cause it to move in a direction away from the mouth of the human being so as to produce a suction to discharge the air from the lungs.

2. The method of producing artificial respiration which comprises filling the lungs from a suitable source of compressed gas until a back pressure of said gas sets in, when the lungs have been filled and diverting the current of gas by said back pressure to cause it to move in a direction away from the mouth of the human being so as to produce a suction to discharge the air from the lungs and again causing the compressed gas to enter the lungs, when they have been emptied due to the decreased gas pressure.

JOHANN HEINRICH DRÄGER.

Witnesses:
 Johs. Wulf,
 Friedr. Plath.